Figure 1:
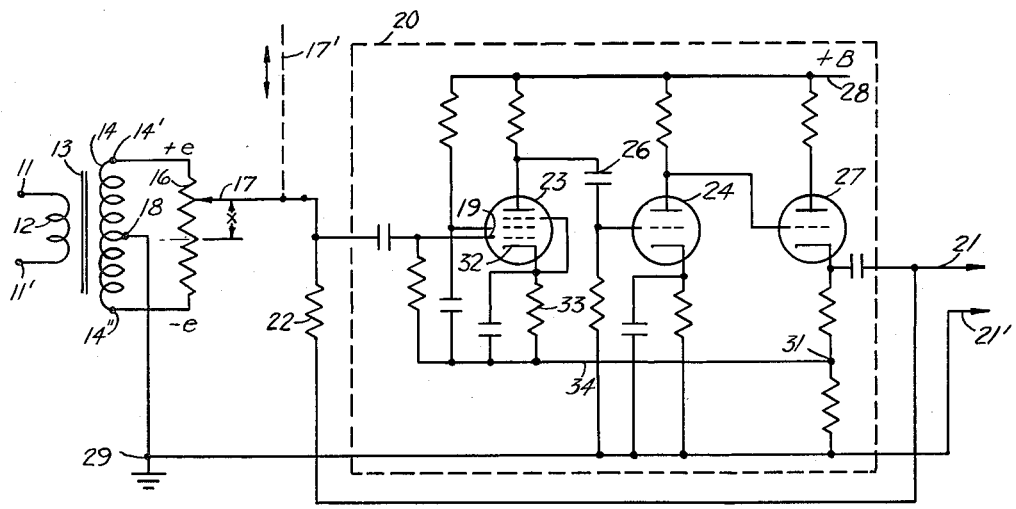

May 9, 1961   J. W. GRAY   2,983,448
TRIGONOMETRIC FUNCTION GENERATOR
Filed Feb. 7, 1955   2 Sheets-Sheet 1

INVENTOR.
JOHN W. GRAY
BY
ATTORNEY.

May 9, 1961        J. W. GRAY        2,983,448
TRIGONOMETRIC FUNCTION GENERATOR
Filed Feb. 7, 1955        2 Sheets-Sheet 2
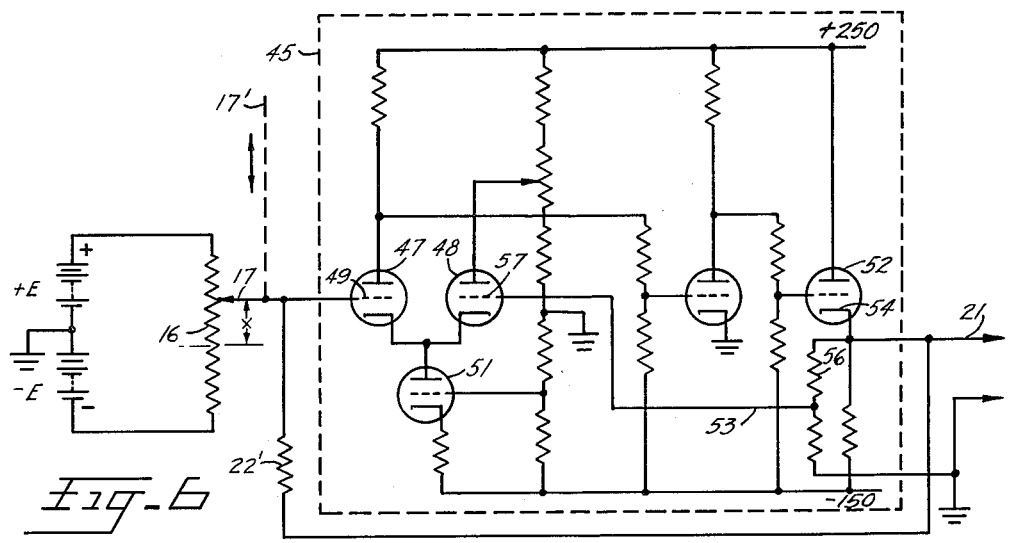
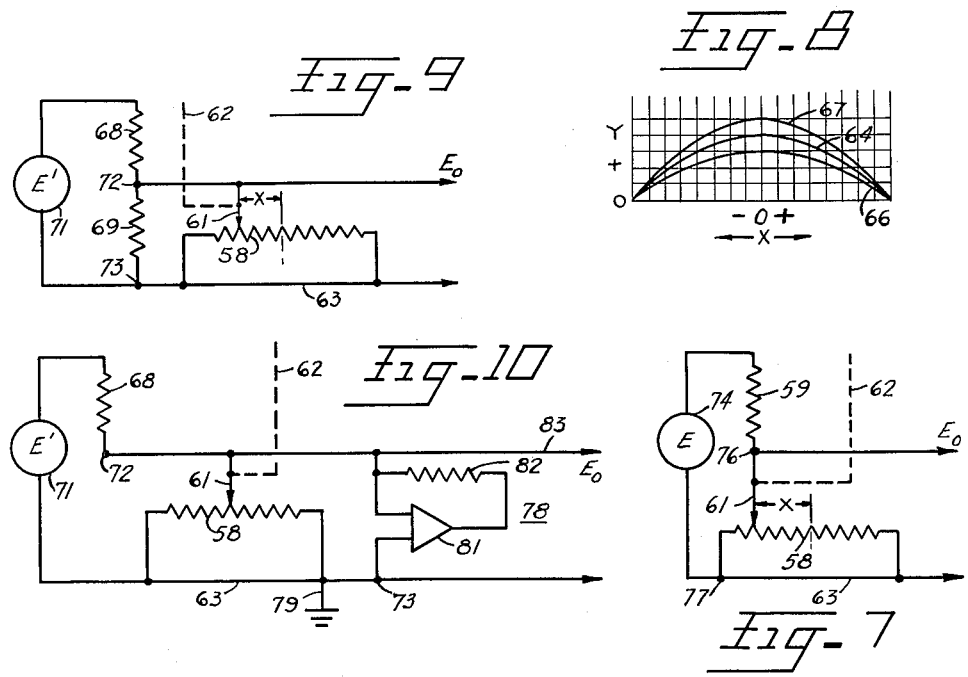
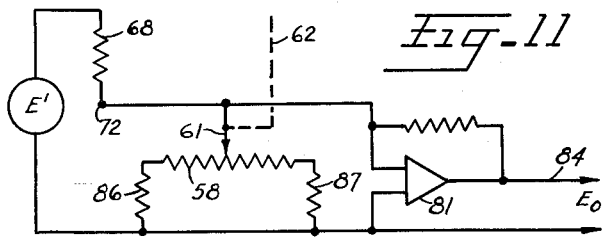
INVENTOR.
JOHN W. GRAY
BY
ATTORNEY United States Patent Office 2,983,448
Patented May 9, 1961

2,983,448

TRIGONOMETRIC FUNCTION GENERATOR

John W. Gray, Pleasantville, N.Y., assignor to General Precision, Inc., a corporation of Delaware Filed Feb. 7, 1955, Ser. No. 486,536

5 Claims. (Cl. 235—186)

This invention relates to trigonometric function generators and more particularly to such generators of the electronic type utilizing a linear adjustable voltage divider as a principal component of the computing element.

The present invention employs only three basic apparatus components, a linear voltage divider or potentiometer, a resistor, and an amplifier, to compute trigonometric functions. The amplifier and resistor together constitute a single functional component having the properties of a resistance with a range of both positive and negative values. By employing these components the sine, cosine and tangent functions can be computed, and since the secant, cosecant and cotangent functions are merely these functions inverted, all six simple trigonometric functions can be automatically computed with the aid of the instrument of the invention.

In some cases the combination of amplifier and resistor behaves like a negative resistance, in other cases the amplifier may be omitted. In each case the input consists of the mechanical positioning of the voltage divider slider and the output is the voltage between the slider and a circuit reference potential point, although the slider voltage may be amplified in some cases before it serves as output. In all cases the input power may be either alternating or direct.

It is well understood that trigonometric functions can be directly generated by non-linear, appropriately tapered or shaped voltage dividers. However, the accuracy of such voltage dividers is greatly inferior to that of linear voltage dividers, so that the present invention employing only linear voltage dividers is useful for reasons of economy and accuracy.

Since the output function always contains the supply voltage magnitude as a factor, it is obvious that, if the supply voltage be made to vary in accordance with a second independent variable, the output function becomes the product of one variable multiplied by a trigonometric function of another variable.

One object of this invention is to provide an instrument for automatically calculating trigonometric functions.

More specifically, an object of the invention is to provide a trigonometric calculating instrument for computing the sine and cosine functions.

Another object is to provide a trigonometric calculating instrument which is easily constructed of standard accurate circuit components which yield accurate results.

A further understanding of the invention may be secured from the detailed description and drawings, in which:

Figures 1 and 6 are schematic circuits of sine function generators.

Figure 4:
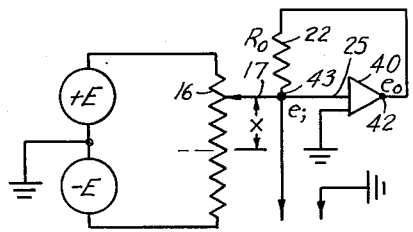
Figure 2:
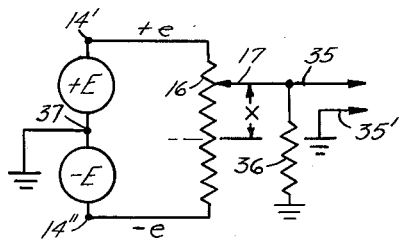
Figure 5:
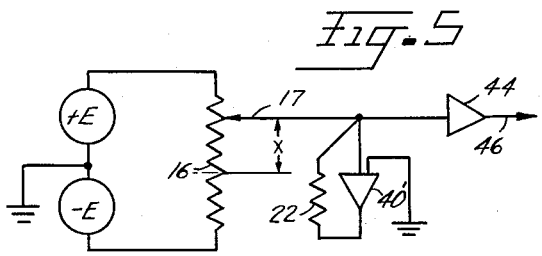

Figures 2, 4 and 5 schematically illustrate the operation of a sine function generator.

Figure 3:
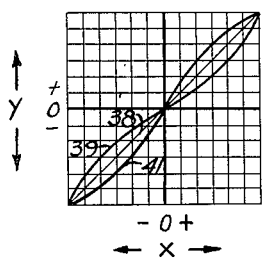

Figures 3 and 8 are graphs illustrating operation of the function generators of the invention.

Figures 7, 9, 10 and 11 schematically illustrate the operation of a cosine function generator.

Referring now to Fig. 1, an alternating-current constant voltage source represented by terminals 11—11' is connected to the primary winding 12 of an isolating transformer 13.

The secondary winding 14 is connected to a voltage divider or potentiometer 16 having a slider 17, so that the slider voltage varies between $+e$ and $-e$ relative to a center tap 18 of the secondary winding depending upon the slider position. The opposite signs of notations $+e$ and $-e$ are used to indicate that the alternating voltage phases are opposite at the ends of the secondary winding. The slider 17 is mechanically positioned by a mechanical input 17', the displacement $x$ relative to the center position being representative of the computer input quantity, $x$ being capable of being given either a positive or negative value.

The slider 17 is electrically connected to the input control electrode 19 of an alternating current amplifier 20 having an output conductor 21. A positive feedback resistor 22 is connected between the amplifier input and output terminals.

The amplifier 20 contains an input stage comprising pentode 23, a second stage comprising triode 24 coupled by condenser 26, and an output cathode follower 27 direct-coupled to the second stage. The anodes of all tubes are supplied with potential from a positive direct-current source 28 and the cathodes of triodes 24 and 27 are returned to the other terminal of the positive source represented by a ground terminal 29. The cathode follower 27 is provided with a cathode resistor tap 31, to which point the cathode 32 of the pentode 23 is returned through resistor 33 and conductor 34. This connection 34 feeds back amplifier output energy in the negative sense in sufficient amount to render the amplifier linear and to make its gain very nearly constant throughout its range.

This last requirement is important because any variation in gain appears as an output signal error.

The connection of the amplifier output and input through resistor 22 constitutes a positive feedback connection which, with suitable proportioning of components, causes the combination of amplifier and resistor to have the properties of a negative resistance and to behave as such. When the amplifier has the following easily attained properties, the negative resistance characteristics are suitable for use in the present invention. The amplifier must have a positive voltage gain greater than unity but reasonably low and preferably of the optimum value for negative resistance operation; the amplifier excluding resistor 22 must have an input impedance that is very high; and the amplifier output impedance must be negligibly low relative to the impedance of resistor 22. It also is desirable to arrange the amplifier to have no zero error. That is, zero output signal voltage represents zero input position. In satisfying these requirements the amplifier may have any number of stages and employ any types of discharge tubes.

In place of taking the computer circuit output from the amplifier output terminal the output may be taken directly from slider 17, since the amplifier is accurately linear and therefore the only factor by which signals taken from the two points differ is the gain of the amplifier.

However, if output is taken from slider 17 the load must have very high or infinite impedance so as not to distort the characteristic of potentiometer 16. If the output is taken at conductor 21 the load may be of low impedance because it is driven by a negative feedback amplifier.

This circuit of Fig. 1 when actuated by a positioning signal introduced by mechanical input 17' emits a voltage at the output conductor 21 approximately representing the sine of the positioning signal. That is, $$y = a \sin bx \quad (1)$$

in which $x$ is the fractional angular displacement of the slider 17 from its center position, $y$ is the output voltage and $a$ and $b$ are scale constants. The approximation may be made very close by proper proportioning of the magnitude of the negative resistance and of the potentiometer resistance.

The operation of the circuit of Fig. 1 is better understood by reference to Fig. 2. In this figure the sources $+E$ and $-E$ represent the induced voltage in secondary winding 14, Fig. 1, causing the oppositely phased potentials to ground of $+e$ and $-e$ at the winding terminals 14' and 14", respectively. Potentiometer 16, Fig. 2, represents the like-numbered potentiometer of Fig. 1, with slider 17 connected directly to the output conductor 35. A resistance 36 is connected between slider 17 and ground, which is at the potential of the central grounded point 37 of the alternating voltage source.

When the output conductors 35 and 35' are connected to a known load this circuit can be employed as an accurate computer having a readily calculated output relationship. Three cases are distinguished corresponding to infinite, finite positive, and finite negative values of the resistance 36. If this resistance be infinite, the relation of the output voltage $y$ at 35 to the position $x$ of the slider 17 is obviously linear, and is represented in Fig. 3 by the straight line 38. If the resistance 36 is finite and positive, that is, it is the resistance of an ordinary resistor, the characteristic obviously assumes the reversed curve form 39 of Fig. 3 approximating a tangent curve, for as the slider nears either end of its scale the resistor 36 loads the shorter path to the voltage source more than it loads the longer path, so that at any point of the scale the output voltage is lower than in the case of infinite resistance. It is also obvious that the amount by which curve 39 departs from a straight line is increased as the positive resistance of 36 is decreased. It also has been found that if resistor 36 be given negative resistance values the characteristic will be warped in the opposite direction to the reverse curve 41. Also, the more the negative resistance departs from a value of infinity the more curved is its characteristic. When the right degree of curvature is given to the reverse curve 41, a portion of a sine curve passing through the axis crossing point can be very closely approximated.

In place of the center-tapped constant voltage source of Fig. 2 there may be substituted a voltage responsive to a second independent variable, $z$.

Equation 1 then becomes $$y = z \sin bx \quad (2)$$

and the function represents two operations, trigonometric conversion and multiplication.

Figure 4 functionally represents the case in which the resistance 36 of Figure 2 is negative and finite. The slider 17 is connected to an input terminal 25 of an amplifier 40 corresponding to the amplifier 20 of Fig. 1, the other input terminal of the amplifier being grounded. The amplifier output terminal 42 is connected through a resistor 22 having a selected value of positive resistance to its input 25. This connection constitutes a positive feedback path.

This circuit thus diagrammatically represents the more detailed schematic circuit of Fig. 1 except that the output is taken from the potentiometer slider rather than from the amplifier output.

The combination of amplifier 40 and positive resistance 22 constitutes a negative resistance. To show that this is true, let the direction of current flow $I$ at the slider 17 be arbitrarily selected as toward the junction 43. If the output impedance at terminal 42 is low compared with that of 22 and the amplifier input impedance at the input 25 is infinite, then by Ohm's law:

$$I = \frac{e_i - e_o}{R_o} \quad (3)$$

in which $e_i$ is the voltage at junction 43, $e_o$ is the amplifier output voltage at terminal 42, and $R_o$ is the resistance of resistor 22. If the overall gain of the amplifier between terminals 25 and 42, excluding the effect of resistor 22, be termed $g$, then $g e_i$ may be substituted for $e_o$ and $$I = \frac{e_i - g e_i}{R_o} \quad (4)$$

$$= -\frac{e_i}{R_o}(g - 1) \quad (5)$$

Now, if the ohmic condition at the slider be expressed by $$R = \frac{e_i}{I} \quad (6)$$

in which R is the total resistive effect from slider to ground of the amplifier 40 and resistor 22, and substituting for I its value from (5), then $$R = -\frac{R_o}{g - 1} \quad (7)$$

That is, the total resistance is negative, and is numerically equal to the resistance of resistor 22 divided by one less than the gain of amplifier 40.

If output be taken from the amplifier output terminal 42 the amplifier 40 serves two functions; that of generating a negative resistance effect and that of amplifying the output. A second amplifier may be employed for the second function, in which case the relationships may be clearer. This is indicated in Fig. 5, in which amplifier 40' symbolizes part of the negative resistance and amplifier 44 symbolizes the amplification of the sine function, with the amplified output being impressed on conductor 46. It is noted that fictitious amplifiers 40' and 44, Fig. 5, merely symbolize two concurrent functions of the realizable amplifier 40, Fig. 4.

A circuit for generating the sine function but employing direct current signal supply is schematically shown in Fig. 6. The voltage sources $+E$ and $-E$ in this case are direct-current batteries and the amplifier 45, corresponding to amplifier 40, Fig. 4, is direct coupled. The potentiometer 16, slider 17 and input positioning mechanism 17' are identical with those of Fig. 1. The negative resistance consists of the combination of amplifier 45 and the resistor 22'. Output is taken from the amplifier output 21, although it may be taken from slider 17 if the load impedance is high or infinite.

The direct-coupled amplifier 45 has a first balanced stage comprising triodes 47 and 48, with the input being applied to the control grid 49. The triode 51 keeps the first-stage current constant to minimize common-mode potential effect. The final stage is a cathode follower 52. A negative feedback connection 53 connects the final cathode 54 through resistor 56 to the first stage reference grid 57 to make the amplifier linear and the output impedance low, and reducing the gain to a low optimum value.

The circuit of Fig. 7 when properly proportioned may be used to compute the cosine function. The circuit consists of a constant-voltage source of potential E, either alternating or direct, a linear potentiometer 58, and a resistance 59 connecting the potential source and the potentiometer slider 61. The input signal is a positioning motion applied through a mechanism 62 to the potentiometer slider 61. The measurement of the input signal is determined by the distance $x$ in terms of fractional angular measure, positive or negative, from the center slider position. The output signal $E_o$ is the voltage between the slider and the ends of the potentiometer, which are strapped together at 63 and connected to the voltage source return terminal, an amplifier being used or not as is desired.

When the resistor 59 has infinite resistance, so that current does not change with slider movement, the output $y$ is a parabolic function of the input $x$, or $$y = c - dx^2 \tag{8}$$

in which $c$ and $d$ are constants. This is illustrated in Fig. 8 by curve 64. When the resistance 59 is a resistor having a finite positive value the curve is flattened and is no longer a parabola. This is represented in Fig. 8 by curve 66. When the resistance 59 is negative and finite, the departure of the curve from the parabolic form 64 is in the opposite direction and is represented by curve 67. This curve approximates the cosine form, and when proper circuit proportions are employed the approximation may be made very close within a selected range. That is, $$y = f \cos kx \tag{9}$$

in which $f$ and $k$ are constants.

If instead of the constant voltage source E, Fig. 7, a potential $z$ representing by its magnitude a second independent variable be employed, the output is the product of that independent variable and the cosine function, or $$y = z \cos kx \tag{10}$$

In instrumenting the cosine form of the invention it is found desirable to convert the circuit into another form in which a practical form of negative resistance having one side connected to a selected constant voltage level can be employed. The equivalent circuit is shown in Fig. 9. That these circuits are equivalent is shown by applying Thévenin's theorem to the network consisting of resistances 68 and 69 with voltage source 71 and having the two output terminals 72 and 73. In accordance with this theorem this network is equivalent to a two-terminal network consisting of a source and resistance in series and is therefore equivalent to the source 74 and resistance 59 of Fig. 7, with the output terminals 76 and 77. In Fig. 9 the potentiometer 58 is the same as that of Fig. 7, with the input signal mechanically applied to the slider 61 by the mechanism 62, and the output $E_o$ is taken from the slider and the strap 63. Therefore since part of the circuit of Fig. 9 is equivalent to part of Fig. 7, and since the rest of the circuits are identical, the entire circuits are equivalent.

When the voltage source E' of Fig. 9, instead of being held constant, is made to vary in accordance with a second independent variable $z$, the output $y$ is in accordance with Equation 10 and represents two operations, trigonometric conversion and multiplication.

In Fig. 10 the source 71, resistor 68, potentiometer 58 and terminals 72 and 73 are the same as the like-numbered components of Fig. 9, and similarly connected. A branch 78, Fig. 10, is connected similarly to the resistance 69 of Fig. 9. The input is applied through the displacement mechanism 62 and the output may be taken from the slider 61 as in Figs. 7 and 9. The ends of the potentiometer 58 are strapped together by a conductor 63 which is grounded as indicated by reference character 79. This arrangement permits the branch 78 to be made in the form of a negative resistance having one end grounded while leaving the resistance 68 to be separately instrumented by a positive resistance consisting of an ordinary resistor, thus conducting current from the source E' to the potentiometer slider. Thus negative resistance branch 78 represents resistance 69, Fig. 9, and a part of resistance 59, Fig. 7, and by proper proportioning of values of the components of Fig. 10 the equivalent resistance 59, Fig. 7, is rendered negative.

Instrumentation of the branch 78 is effected by use of a stable and linear amplifier in shunt with a positive resistance serving as a positive feedback path, the whole combination constituting a negative resistance. Those configurations of negative resistors described for use with the sine function generator and indicated in Fig. 1 for alternating current signals as the combination of amplifier 20 and resistor 22, and in Fig. 6 for direct current signals as the combination of amplifier 45 and resistor 22', are quite satisfactory for use in Fig. 10 as branch 78. In this figure the amplifier is represented at 81 and the shunt resistor at 82 represents 22, Fig. 1, or 22', Fig. 6.

It is obvious that the insertion of an amplifier in the output conductor of Fig. 10 would not change the form of the output quantity $E_o$ as a function of the input or inputs, but would merely multiply it by the amplifier gain. Consequently the output may well be taken from the output of amplifier 81, as indicated in Fig. 11 at the output conductor 84, with a lowering of output impedance and an improved flexibility of use. This is analogous to taking the output from the slider through another amplifier.

Resistors 86 and 87 in series with potentiometer 58 are desirable when operation is to be limited to the portions of the cosine curve near $x=0$. The parameters may then be arranged to secure very high accuracy in the used portion at the expense of inaccuracy in the unused portion. By similar use of resistors and manipulation of parameters high accuracy may be secured over any other restricted part of the cosine function curve.

Since sine and cosine curves over a complete cycle are identical in form, it is obvious that, by varying the independent variable in Equations 1 and 9 and by displacing the instrument zero, either the circuit of Fig. 2 or of Fig. 7 may be employed to generate either sine or cosine functions. However, the utility of this invention lies in providing very high accuracy around the independent variable zero value, hence in instrumenting the invention the two circuit forms of Figs. 2 and 10 are employed. Each of these forms is exceedingly accurate in the region of its independent variable zero value and is less accurate 90° therefrom, as is evident by analysis of the circuit errors.

What is claimed is:

1. A sine function computer comprising a linear voltage divider having a potential source connected thereacross, a slider movable along said voltage divider, means for displacing said slider in accordance with an input quantity, a negative resistance means connected between said slider and a midterminal of said potential source, and means for deriving an output signal from said slider.

2. A sine function computer comprising, a linear potentiometer, a potential source connected in shunt to said potentiometer, said potentiometer including a slider, means for displacing said slider from the midpoint of said potentiometer in proportion to the sense and magnitude of an input quantity, an amplifier circuit having a negative resistance characteristic connected between said slider and a midpotential terminal of said potential source, and means for deriving a signal magnitude from said amplifier circuit which is proportioned to the potential existing at said slider.

3. A sine function generator as set forth in claim 2 in which the means for deriving the signal magnitude from said amplifier circuit comprises an output circuit connected to said slider.

4. A sine function generator as set forth in claim 2 in which the means for deriving the signal magnitude from said amplifier circuit comprises an output circuit connected to the output circuit of said amplifier.

5. A sine function computer comprising, a linear potentiometer, a potential source connected in shunt to said potentiometer, said potentiometer including a slider, means for displacing said slider from the midpoint of said potentiometer in proportion to the sense and magnitude of an input quantity, an amplifier having its input connected to said slider, a positive feedback circuit including a resistor connected between the output and input of said amplifier whereby said amplifier and resistor circuit develops a negative resistance characteristic, circuit means interconnecting a midpotential terminal of said potential source and said amplifier and resistor circuit, and means for deriving an output signal proportional to the potential existing at said slider.

References Cited in the file of this patent

UNITED STATES PATENTS

| | | |
|---|---|---|
| 2,469,569 | Ohl | May 10, 1949 |
| 2,598,312 | Shumard | May 27, 1952 |
| 2,760,147 | Couanault | Aug. 21, 1956 |

OTHER REFERENCES

Reducing Potentiometer Loading Error (Nettleton and Dole), The Review of Scientific Instruments, vol. 18, No. 5, May, 1947, pp. 332–341.

Electronic Instruments (Greenwood, Holdam, MacRae), Radiation Laboratory Series, vol. 21, published by McGraw-Hill Book Co., New York, 1948, pages 101–103.

New Circuit Computers Tangents (Seay), Control Engineering, vol. 1, No. 3, pages 59 and 60. Nov. 1954.

Analog Methods in Computation and Simulation (Soroka), published by McGraw-Hill Book Co., New York, 1954, pages 48–52.